United States Patent Office 2,952,156
Patented Sept. 13, 1960

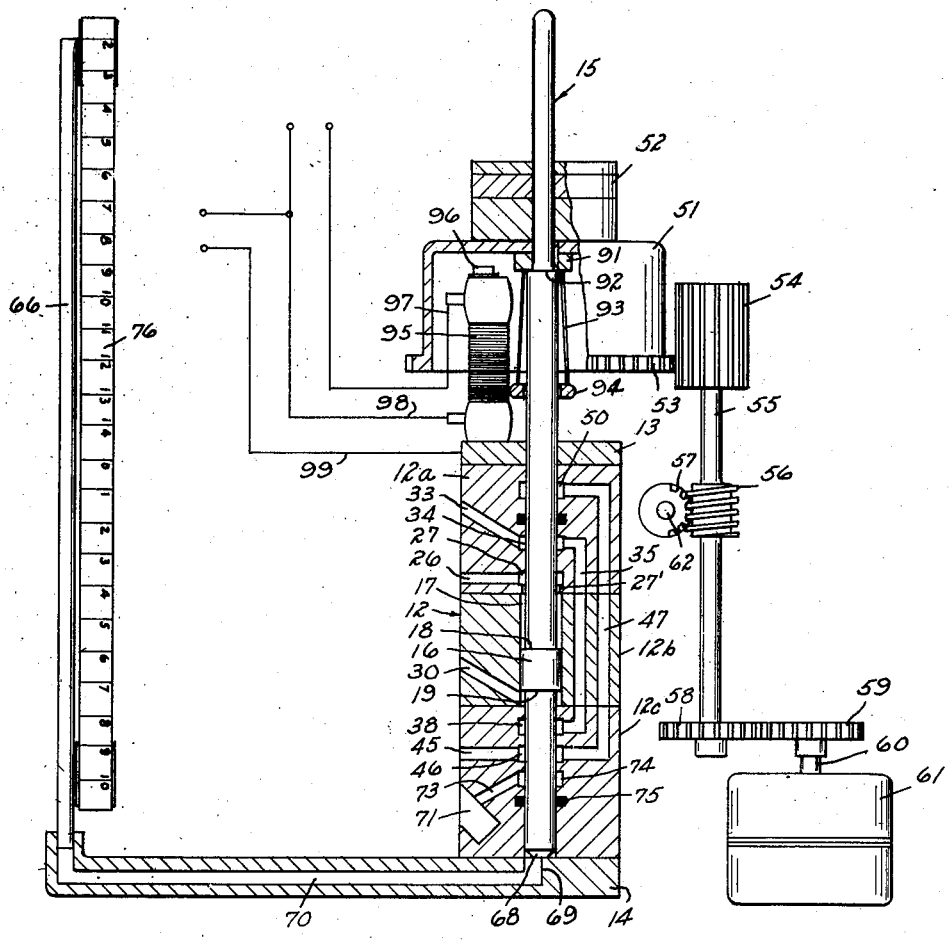

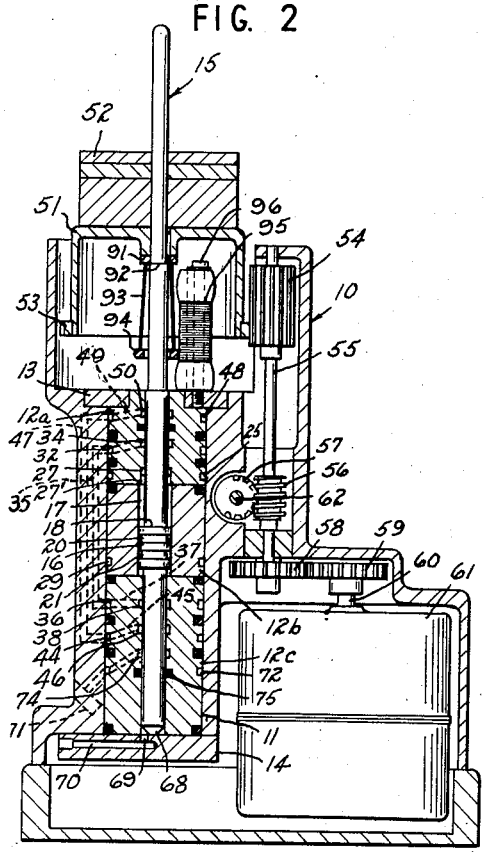
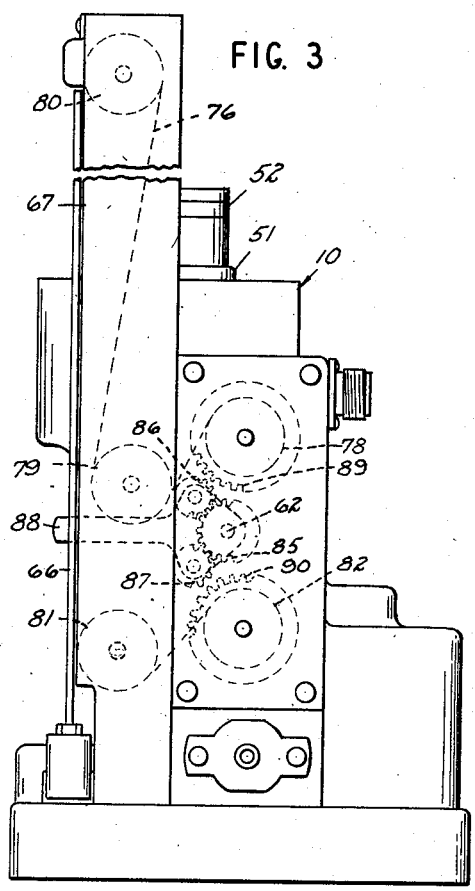
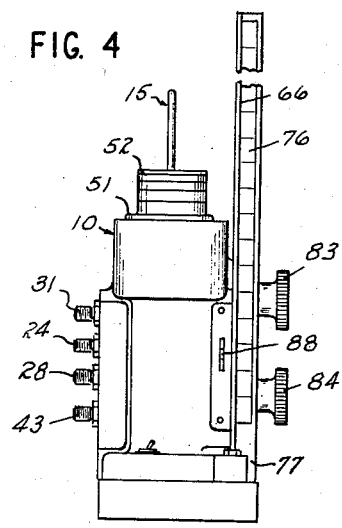

2,952,156

PRESSURE DIFFERENTIAL GAUGE

Leighton Lee II, Guilford, Conn., assignor to The Lee Company, Westbrook, Conn., a corporation of Connecticut Filed Sept. 26, 1955, Ser. No. 536,529

15 Claims. (Cl. 73—419)

This invention relates generally to pressure gauges and, more particularly, to an improved pressure differential gauge for directly measuring a differential in pressures of a fluid system.

It is an object of this invention to provide a novel and improved direct reading pressure differential gauge capable of continuous measurement of the difference in pressure between two points in a fluid system with a fine degree of accuracy and over a wide range of applied and differential pressures and which is equally accurate in measuring large or small pressure differences throughout the range.

A more specific object of the invention is to provide a precise differential gauge which will produce a direct reading of differential pressure which is not dependent on mechanical arrangements to produce the indicating function and which will not be subject to the many variables and inaccuracies of present measuring systems.

It is further an object of this invention to provide a gauge as described having means for providing a recording or remote reading of the differential pressure if desired.

It is still another object of this invention to provide a gauge as described which is simple to use and which is easily transported about a laboratory or in the field.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a schematic illustration of a pressure differential gauge incorporating the novel improvements of this invention;

Fig. 2 is a cross sectional side view of a pressure differential gauge constructed in accordance with this invention;

Fig. 3 is a side view of the gauge of Fig. 2; and

Fig. 4 is a front view of the gauge of Fig. 2.

With reference to the drawings, the gauge constructed in accordance with this invention is comprised of a housing 10 having a cylindrical bore 11 in which is received a cylinder 12 which, for ease of manufacture, is made in three sections 12a, 12b, and 12c. The cylinder sections are retained in the housing 10 by means of the end plates 13 and 14. A shaft 15 is slidably received in the bore of the cylinders 12a and 12c and has a piston 16 intermediate its ends and slidably received within the confines of the enlarged bore or chamber 17 of the cylinder 12b. The movement of the shaft 15 in one direction is limited by engagement of the piston 16 with the cylinder 12a and in the other direction by the engagement of the lower end of the shaft with the end plate 14. The piston 16 forms axially opposed radial faces or working surfaces 18 and 19 which in this specific embodiment are of equal area. Annular grooves 20 and 21 are provided on the piston 16 for the collection of any foreign matter which might accumulate on the inner walls of the cylinder 12b.

A fitting 24 is provided on the housing 10 for the introduction of fluid, which in the normal use of the gauge will be fluid from one point of the system being compared, into the gauge to act upon the working surface 18 of the piston. The fitting 24 is connected to the chamber 17 of the cylinder 12b by means of annular recess 25 on the outer diameter of the cylinder 12a, the passage 26 in said cylinder and the intercommunicating annular recesses 27 and 27' in the bore of said cylinder. A second fitting 28 for the introduction of fluid from the second point of the system is provided on the housing 10 in communication with the annular recess 29 on the outer diameter of the cylinder 12b which recess is in turn connected by the passage 30 in said cylinder to the chamber 17 so as to direct fluid introduced through the fitting 28 onto the working surface 19 of the piston.

In order to carry off any leakage of fluid axially of the piston and cylinders, a fitting 31 is provided in the housing 10 in communication with the annular recess 32 on the outer diameter of the cylinder 12a. The last mentioned recess is connected by means of a passage 33 in the cylinder 12a to the annular recess 34 in the inner bore of said cylinder 12a. A passage 35 in the housing 10 provides communication between the annular recess 32 and an annular recess 36 on the outer diameter of the cylinder 12c which recess 36 is connected by means of a passage 37 to the annular recess 38 in the bore of the cylinder 12c. An atmospheric sump drain fitting 43 is also mounted in the housing 10 in communication with an annular recess 44 on the outer diameter of the cylinder 12c. The recess 44 is connected by means of a passage 45 to an annular recess 46 in the bore of the cylinder 12c. A passage 47 in the housing 10 connects the recess 44 with an annular recess 48 in the outer diameter of the cylinder 12a and through a passage 49 to the annular recess 50 in the bore of the cylinder 12a.

A turntable 51 in the form of an inverted cup-like member is mounted on the upper end of the shaft 15 and is received by the housing 10 in spaced relationship thereto. The turntable 51 has a ring gear 53 on the outer periphery of its lower end which is meshed with an elongated pinion 54. The pinion 54 is mounted on a shaft 55 journaled in the housing and having intermediate its ends a worm gear 56. The worm gear 56 is connected to a pinion 57 mounted on a shaft 62 in order to provide a drive for a portion of the gauge to be hereinafter described. The shaft 55 is rotated by means of the gear 58 mounted on said shaft and in mesh with a gear 59 mounted on the drive shaft 60 of an electric motor 61 mounted in the housing 10. During the operation of the gauge, the motor 61 and the associated gearing serve to rotate the turntable 51 and thus the shaft 15 and piston 16 to reduce to a negligible amount the axial friction of the shaft and piston with respect to the cylinders. As will be later seen, the turntable 51 serves as a means to support a series of weights 52 coaxially mounted on the shaft 15.

In accordance with this invention, a tube 66 is supported in a vertical position on the housing 10 by means of a tube support 67. The tube 66 which is partially filled with a liquid such as water or mercury has its upper end open to atmosphere and its lower end in communication with a working surface 68 on the lower end of the shaft 15 by means of passages 69 and 70 in the end plate 14. As will be hereinafter apparent, if an extremely accurate measurement is desired, it is preferable to use a liquid of lower density such as water in the tube; however, in order to reduce the overall size of the structure, the specific embodiment utilizes mercury.

In order to provide for a collection of any mercury which may pass axially of the end of the shaft 15, a recess or trap 71 open to atmosphere is provided in the housing 10. The trap or recess 71 is in communication with an annular recess 72 on the outer diameter of the cylinder 12c, which recess in turn is connected by means of a passage 73 to an annular recess 74 in the bore of the cylinder 12c. A seal 75 is located between the working surface 68 of the piston 15 and the recess 74 to prevent axial leakage of the mercury. In the event of seal failure, however, the mercury will flow into the trap 71 where it will be visually apparent to the gauge operator. Leakage of the mercury axially of the recess 74 is effectively prevented by the fact that the next axially adjacent recess 46 is also open to atmosphere through the atmospheric sump fitting 43.

It can be readily seen that if sufficient mercury is placed in the tube 66 it is possible to compensate for the tare weight of the vertically movable portions of the gauge as well as to position the piston 16 intermediate its limits of travel at an axial position which will be hereinafter referred to as the initial balance position. Obviously there will be one height of the mercury in the tube 66 corresponding to the initial balance position of the piston. This height of the mercury will be hereinafter referred to as the zero position of the mercury column.

In the normal operation of the gauge fluid of lower pressure is introduced through the fitting 24 so as to act upon the upper working surface 18 of the piston 16 while fluid of higher pressure is introduced through the fitting 28 so as to act on the lower working surface 19 of the piston. Inasmuch as the working surfaces 18 and 19 are of equal area an upward force will be exerted on the piston, which force will be equal to the difference in pressures of the fluids multiplied by the area of the working surface 19. A series of weights 52 are then placed on the turntable 51 by the operator to provide a rough counterbalance for this upward force. The values of the weights 51 are chosen to approximately offset the pressure differential to be measured; however, no attempt is made to precisely balance the piston by the use of the weights 51, as with a conventional "dead weight" tester. As will be obvious from Fig. 1 of the drawings, if the weights 51 are momentarily larger in value than the upward force exerted on the piston 16 by the differential pressure, the piston 16 will be moved downwardly. This downward movement of the shaft 15 will result in an increase in the height of the mercury column and will continue until the height of the mercury column increases sufficiently to present a force on the working surface 68 which will offset the difference in forces exerted by the weights and the differential pressure of the fluids, at which time the piston will be balanced in one position between the limits of its axial movement. If as stated above the value of the weights exceeds the force exerted by the differential pressure, this position of balance of the piston will be somewhat below the hereinbefore referred to initial balance position of the piston, and the height of the mercury will be somewhat above its zero position. Inasmuch as the area of the working surface 68 of the piston is known and the change in height of the mercury column may be measured, it is apparent that the force necessary to balance the piston in its new position is easily determined. Thus, to determine precisely the differential pressure existing between the fluids it is merely necessary to subtract from the value of the weights the force represented by the increase in the height of the mercury column. It is, of course, apparent that if the values of the weights 51 are momentarily less than the upward force exerted by the differential pressure, the piston 16 will be moved upwardly thus permitting a decrease in the height of the mercury column until the piston is again balanced at one position between its limits of travel. This latter balance position will, of course, be somewhat above the initial balance position of the piston and the then existing height of the mercury column will be somewhat below its zero position. To determine the differential pressure under this set of circumstances, it is, of course, necessary to add the value of the weights to the force represented by the decrease in the height of the mercury column from its zero position. From the above it should be readily apparent that for any given position of the piston 16 there is a corresponding height of the mercury column and further that the axial position of the piston is directly related to the differential pressure of the fluids being measured. Therefore, knowing the dimensions of the mercury column and the working surfaces of the gauge it is possible to provide a scale 76 adjacent the mercury column having graduations thereon in terms of pressure, corresponding to the change in height of the mercury column from its zero position. As can be seen from Fig. 1, the scale 76 may be provided with graduations indicating a vacuum range as well as a positive pressure range. In order to make unnecessary the step of adding or subtracting the pressure shown on the scale to the pressure represented by the weights the scale 76 may be provided in a length which permits the imprinting or otherwise placing thereon of a range of pressures corresponding to the range of pressure differentials for which the gauge is intended for use. In the specific embodiment, the scale provides for a range of measurements from a vacuum to a pressure of 600 pounds per square inch, however, this is not to be taken as in any way limiting the gauge to this pressure range. Obviously, the length of such a scale far exceeds the length of the tube 66 and, in accordance with this invention, one end of the scale is wound upon a roller 78, from which it is passed about rollers 79 and 80 along the face 77 of the tube support, around a roller 81, and finally has the other end wound about a roller 82. Knobs 83 and 84 are provided for the rollers 78 and 82, respectively, so that the scale may be manually adjusted relative to the zero position of the mercury column and the desired range of pressures positioned alongside the mercury column by merely winding the scale on and off either the roller 78 or 82. In order to obtain a direct reading from the gauge of the precise differential pressure, it is merely necessary to position the graduation on the scale 76 which corresponds to the value of the weights 51 in registry with the zero position of the mercury column. It is obvious then that the value of the differential pressure existing between the two points in the fluid system being measured may be directly and continuously read from the scale 76.

In order to provide a means for quickly adjusting the scale 76 relative to the zero position of the mercury column an adjusting lever 88 is provided. One end of this lever extends through the front of the housing 10 where it is accessible to the operator. The other end of the lever is mounted for pivotal movement about the shaft 62 which as hereinbefore mentioned is rotatably connected to the drive shaft 55 by means of the pinion 57 mounted on the shaft 62 and the worm gear 66 mounted on the drive shaft 55. A gear 85 is also rotatably connected to the shaft 62 and is in driving connection with the idler gears 86 and 87 which are rotatably mounted on the adjusting lever 88. The rollers 78 and 82 are provided with gears 89 and 90 for selective engagement with the idler gears 86 and 87 respectively. As has been hereinbefore mentioned, the shaft 15 is continuously rotated when the gauge is being used in order to reduce axial friction of the piston and shaft. Therefore, the gear 85 and idler gears 86 and 87 will also be continuously rotated during use of the gauge. In order to move the scale upwardly along the face of the tube support, it is merely necessary to pivot the adjusting lever 88 in a clockwise direction to engage the idler gear 86 with the roller gear 89 and conversely to move the scale downwardly along the tube support, the adjusting lever 88 will be pivoted in a counterclockwise direction to engage the idler 87 with the roller gears 90.

In accordance with this invention there has also been provided a means whereby an electric voltage variable in proportion with the axial position of the shaft 15 may be provided for remote indication or for use with an instrument such as a recording volt meter in order to provide a record of change in differential pressure being measured. When such a feature is provided, this invention may be considered a pressure differential transducer. A collar 91 is mounted on the shaft 15 between the turntable 51 and a shoulder 92 on the shaft. A plurality of wires 93 are mounted in depending fashion from the collar 91 and connected at their lower ends to a brush element 94, preferably of carbon, which surrounds the piston. A wire wound resistor 95 is vertically mounted on the end plate 13 by means of elongated screw 96 in relative sliding engagement with the brush element 94. As is apparent in Fig. 2, the axial bore of the resistor 95 is greater in diameter than the diameter of screw 96 in order that the resistor may be rotated out of engagement with the brush element when it is not desired to electrically record the change in differential pressures. A voltage of known value may be applied across the resistor through the connections 97 and 98 and the relative axial position of the piston determined by measuring the voltage between the center tap connection 99 and either one of the connectors 97 or 98. The center tap connection 99 is electrically connected to the plate 13 which in turn is electrically connected through the shaft 15, collar 91 and wires 93, to the brush element 94.

From the above it can be seen that there has been provided a gauge capable of continuously measuring the difference in pressures existing between two points in a fluid system with a high degree of accuracy. The gauge incorporates novel features which provide for visual direct reading of the differential pressure to be measured and also means to electrically record the changes in pressure if such is desired.

It is also to be observed that the gauge may be used as a vacuum gauge as well as a positive pressure gauge by merely connecting the high pressure fitting 28 with atmosphere and connecting the low pressure fitting 24 to the source of negative fluid pressure. The gauge is suitable for use for measurement of the pressures of any fluid normally used in a hydraulic system including air and also may be used as a means to calibrate other pressure gauges by merely opening the low pressure fitting 24 to atmosphere and connecting the high pressure fitting 28 to the same source of fluid pressure as the gauge to be measured.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a gauge for measuring the pressure differential between the pressures of two fluids, the combination comprising a member movable in opposite directions, means for applying the two fluid pressures to said member to produce a force differential in one direction of movement of said member, means exerting a predetermined force on said member in a direction opposite that of the fluid force differential, and a column of liquid independent of said two fluids acting directly on said member to apply a variable and measurable force to said member to counterbalance the algebraic summation of said fluid force differential and said predetermined force.

2. In a gauge for measuring the pressure differential between the pressures of two fluids, the combination comprising piston means movable in either direction, means for connecting said two fluids to the piston means to produce a fluid force differential on said piston means in an axial direction, means exerting a predetermined force on said piston means in a direction opposite that of the fluid force differential, and a column of liquid communicating with and acting directly upon said piston means to exert an axial force upon said piston means to balance the algebraic sum of said fluid force differential and said predetermined force.

3. In a pressure differential gauge, a member movable in opposite directions, means to direct fluid of one pressure against said member to exert a force on said member in one direction of movement, means to simultaneously direct fluid of a different pressure against said member to exert a force on said member in an opposite direction of movement, means to exert a known force on said member in a direction so as to oppose movement of said member, and means comprising a column of liquid communicating directly with and acting upon said member so that the head of said column of liquid varies in response to movement of said member relative to a predetermined position thereof and so that the head of said column of liquid everts a varaiable and measurable force on said member to balance the differential force thereon imposed by said fluid pressures and said known force.

4. In a gauge for measuring the pressure differential between two fluids, the combination comprising a cylinder, a piston slidably received within said cylinder, means to apply a known force on said piston in an axial direction, means to connect said two fluids to said cylinder to apply the pressures of said two fluids to said piston in opposite directions to produce a force on said piston opposing said known force, an upstanding tube open to atmosphere at its upper end and containing a column of liquid, and means providing communication of said liquid with said piston to apply the head of said column of liquid to the piston, said communication means arranged so that movement of said piston will displace the liquid in said tube to vary the head of said liquid column to provide a variable and measurable counterbalance force for the differential force produced by said known force and the opposing force produced by said two liquids.

5. In a gauge for measuring the pressure differential between two fluids, the combination of an upstanding cylinder, a piston having first and second ends, said piston being vertically and slidably received in said cylinder for limited axial movement, said first end of said piston extending upwardly and outwardly of said cylinder, said second end extending downwardly of said cylinder, a pair of oppositely facing surfaces on said piston, means to apply the two fluids respectively to said piston surfaces, a support on said first end of said piston for the mounting of a weight thereon, an upstanding tube having its upper end open to atmosphere, the lower end of said tube being in communication with said second end, and a fluid disposed in said tube and exerting an upward balancing force on said second end.

6. In a gauge for measuring the pressure differential between two fluids, the combination comprising an upstanding tube open at its upper end and partially filled with a liquid, a vertically disposed cylinder, a shaft vertically and slidably received within said cylinder for limited movement in either direction, a piston on said shaft intermediate the ends thereof and slidably received within said cylinder, fluid passages in said cylinder adapted to direct fluid of one pressure into said cylinder above said piston and fluid of another pressure into said cylinder below said piston to produce an axially directed differential force on said piston, and an additional fluid passage in said cylinder connecting the lower end of said tube to the lower end of said shaft to provide communication of the liquid in said tube with said lower end of said shaft, said lower end of said shaft effectively providing an axially facing working surface, said liquid in said tube exerting a force on the lower end of said shaft tending to balance the opposing forces on said piston.

7. In a pressure differential gauge, an upstanding cylinder, a shaft vertically and slidably received by said cylinder for limited movement in either direction, one end of said shaft extending upwardly and outwardly of said cylinder and the other end extending downwardly of said cylinder, a piston on said shaft intermediate the ends thereof and coaxial therewith, said piston slidably received within said cylinder and forming a pair of axially opposed working surfaces extending radially of said shaft, a first fluid passage in said cylinder adapted to direct fluid of one pressure into communication with one of the working surfaces of said piston, a second fluid passage in said cylinder adapted to direct fluid of another pressure into communication with the other of said working surfaces on the piston, a support on said one end of said shaft for the mounting of a weight to provide a downwardly directed force on said shaft, said other end of the shaft effectively provided with a downwardly facing working surface, a third fluid passage in said cylinder for the communication of a liquid with said downwardly facing working surface, an upstanding tube having its upper end open to atmosphere and its lower end in communication with said third fluid passage, said third fluid passage and a portion of said tube being filled with a liquid whereby movement of said shaft in either direction will cause a displacement of the liquid in said tube.

8. In a pressure differential gauge, a vertically disposed cylinder, a piston vertically and slidably received in said cylinder, means drivingly connected to said piston to rotate said piston in said cylinder, means to direct fluid of one pressure against said piston to exert a force on said piston in one axial direction, means to simultaneously direct fluid of a different pressure against said piston to exert a force thereon in the opposite direction, means to exert a known force on said piston in a direction to oppose movement of said piston, and means comprising a column of liquid communicating with and acting directly upon said piston to exert a variable and measurable force on said piston to balance the differential force thereon imposed by said fluid pressures and said known force.

9. In a pressure differential gauge, a vertically disposed cylinder, a piston vertically and slidably received in said cylinder, one end of said piston extending upwardly and beyond said cylinder, means to rotate said piston in said cylinder comprising a turntable mounted on said one end of said piston and having means to support a known weight to provide a known downward force on said piston, a ring gear on the periphery of said turntable, and an elongated vertically disposed pinion in engagement with said ring gear, means to simultaneously direct fluids of different pressures against said piston to exert an upward force on said piston, and means comprising a column of liquid communicating with and acting upon said piston to exert a variable and measurable force on said piston to balance the differential force thereon imposed by said fluid pressures and said known force.

10. In a pressure differential transducer, a vertically disposed cylinder, a piston vertically and slidably received in said cylinder, means to direct fluid of one pressure against said piston to exert a force on said piston in one axial direction, means to simultaneously direct fluid of a different pressure against said piston to exert a force thereon in the opposite direction, means to exert a known force on said piston in a direction to oppose movement of said piston, means comprising a column of liquid communicating with and acting directly upon said piston to exert a variable and measurable force on said piston to balance the differential force thereon imposed by said fluid pressures and said known force, said column of liquid being independent of the fluids exerting pressure on said cylinder and means operable by said piston to provide an electrical voltage variable in response to movement of said piston.

11. In a pressure differential transducer, a vertically disposed cylinder, a piston vertically and slidably received in said cylinder, means to direct fluid of one pressure against said piston to exert a force on said piston in one axial direction, means to simultaneously direct fluid of a different pressure against said piston to exert a force thereon in the opposite direction, means to exert a known force on said member in a direction to oppose movement of said piston, means comprising a column of liquid communicating with and acting directly upon said piston to exert a variable and measurable force on said piston to balance the differential force thereon imposed by said fluid pressures and said known force, said column of liquid being independent of the fluids exerting pressure on said cylinder and an electrical resistance element mounted on the transducer and having a variable center tap, said center tap connected to said piston for movement in response to vertical movement of said piston thereby to produce a voltage proportional to piston movement.

12. In a gauge for measuring the pressure differential between two fluids, the combination comprising a cylinder, a piston slidably received within said cylinder, means to apply a known force on said piston in an axial direction, means to apply said two fluids directly to opposite sides respectively of said piston so that the pressures of said two fluids produce a force on said piston opposing said known force, an upstanding tube open at its upper end and containing a column of liquid, means providing communication of said liquid with said piston to apply the head of said column of liquid directly to said piston, said communication means arranged so that movement of said piston will displace the liquid in said tube to vary the head of said liquid column to provide a measurable counterbalance force for the differential force produced by said known force and said opposing force, said column of liquid being independent of the fluids exerting pressure on said cylinder and a scale disposed parallel to said upstanding tube and having indicia thereon to provide a measurement of a change in head of said liquid column.

13. In a gauge for measuring the pressure differential between two fluids, the combination comprising a cylinder, a piston slidably received within said cylinder, means to apply a known force on said piston in an axial direction, means to apply the pressures of said two fluids to said piston in opposite directions to produce a force on said piston opposing said known force, an upstanding tube open at its upper end and containing a column of liquid, means providing communication of said liquid with said piston to apply the head of said column of liquid directly to said piston, said communication means arranged so that movement of said piston will displace the liquid in said tube to vary the head of said liquid column to provide a measurable counterbalance force for the differential force produced by said known force and said opposing force, said column of liquid being independent of the fluids exerting pressure on said cylinder and a scale disposed parallel to said upstanding tube and having indicia thereon in terms of the pressure corresponding to the summation of the forces imposed on said piston by said known force and said liquid column.

14. In a gauge for measuring the pressure differential between two fluids, the combination comprising a cylinder, a piston slidably received within said cylinder, means to apply a known force on said piston in an axial direction, means to apply the pressures of said two fluids to said piston in opposite directions to produce a force on said piston opposing said known force, an upstanding tube containing a column of liquid, means providing communication of said liquid with said piston, said communication means arranged so that movement of said piston will displace the liquid in said tube to vary the head of said liquid column to provide a measurable counterbalance force for the differential force produced by said known force and said opposing force, a scale disposed parallel to said upstanding tube and having indicia thereon to provide a direct reading measurement of the differential pressure of said two liquids, the length of said scale being in excess of the length of said tube, and means to move said scale longitudinally of said tube whereby said scale may be adjusted in accordance with the value of said known force comprising a pair of rollers around each of which is wound an end portion of said scale and means to rotate said rollers in either direction.

15. In a gauge for measuring the pressure differential between two fluids, the combination comprising a cylinder, a piston slidably received within said cylinder, means to apply a known force on said piston in an axial direction, means to apply the pressures of said two fluids to said piston in opposite directions to produce a force on said piston opposing said known force, an upstanding tube containing a column of liquid, means providing communication of said liquid with said piston, said communication means arranged so that movement of said piston will displace the liquid in said tube to vary the head of said liquid column to provide a measurable counterbalance force for the differential force produced by said known force and said opposing force, a scale disposed parallel to said upstanding tube and having indicia thereon to provide a direct reading measurement of the differential pressure of said two fluids, the length of said scale being in excess of the length of said tube, and means to move said scale axially of said tube whereby the scale may be adjusted in accordance with the value of said known force comprising a pair of rollers around each of which is wound an end portion of said scale, a gear coaxially mounted on each of said rollers, a pivoted lever having rotatably mounted thereon a pair of gears respectively associated with said roller gears, means to simultaneously rotate said pair of gears, said lever adapted to be moved so as to selectively engage one of said pair of gears with its associated roller gear.

References Cited in the file of this patent

UNITED STATES PATENTS

| | | |
|---|---|---|
| 593,339 | Steinbart | Nov. 9, 1897 |
| 1,107,298 | Haas | Aug. 18, 1914 |
| 1,419,798 | Bacharach | June 13, 1922 |
| 2,300,327 | White | Oct. 27, 1942 |
| 2,423,340 | Pellettere | July 1, 1947 |
| 2,426,930 | Hicks | Sept. 2, 1947 |
| 2,454,038 | Crever | Nov. 16, 1948 |
| 2,564,116 | Laternser | Aug. 14, 1951 |

FOREIGN PATENTS

| | | |
|---|---|---|
| 742,045 | Germany | Nov. 22, 1943 |
| 811,624 | Germany | Aug. 23, 1951 |